US011467840B2

(12) United States Patent
Darbari et al.

(10) Patent No.: US 11,467,840 B2
(45) Date of Patent: *Oct. 11, 2022

(54) LIVELOCK RECOVERY CIRCUIT FOR DETECTING ILLEGAL REPETITION OF AN INSTRUCTION AND TRANSITIONING TO A KNOWN STATE

(71) Applicant: Imagination Technologies Limited, Kings Langley (GB)

(72) Inventors: Ashish Darbari, Abbots Langley (GB); Iain Singleton, Hemel Hempstead (GB)

(73) Assignee: Imagination Technologies Limited, Kings Langley (GB)

( * ) Notice: Subject to any disclaimer, the term of this patent is extended or adjusted under 35 U.S.C. 154(b) by 33 days.

This patent is subject to a terminal disclaimer.

(21) Appl. No.: 16/743,586

(22) Filed: Jan. 15, 2020

(65) Prior Publication Data

US 2020/0150964 A1 May 14, 2020

Related U.S. Application Data

(63) Continuation of application No. 15/340,554, filed on Nov. 1, 2016, now Pat. No. 10,552,155.

(30) Foreign Application Priority Data

Jun. 20, 2016 (GB) ..................... 1610735

(51) Int. Cl.
*G06F 9/32* (2018.01)
*G06F 9/38* (2018.01)
(Continued)

(52) U.S. Cl.
CPC .......... *G06F 9/325* (2013.01); *G06F 9/30145* (2013.01); *G06F 9/3802* (2013.01);
(Continued)

(58) Field of Classification Search
CPC .... G06F 9/3865; G06F 9/3861; G06F 8/4442; G06F 9/325

See application file for complete search history.

(56) References Cited

U.S. PATENT DOCUMENTS 5,278,976 A 1/1994 Wu
6,132,109 A * 10/2000 Gregory .................. G06F 30/33
717/131

(Continued)

FOREIGN PATENT DOCUMENTS

EP 0 205 163 A2 12/1986
JP 62-106552 A 5/1987
(Continued)

OTHER PUBLICATIONS

Callahun, "Control Command—No OP Hang Detection," IBM Technical Disclosure Bulletin, vol. 22, No. 7, Dec. 1979, pp. 2720-2721.

*Primary Examiner* — Keith E Vicary
(74) *Attorney, Agent, or Firm* — Potomac Law Group, PLLC; Vincent M DeLuca

(57) ABSTRACT

Livelock recovery circuits configured to detect livelock in a processor, and cause the processor to transition to a known safe state when livelock is detected. The livelock recovery circuits include detection logic configured to detect that the processor is in livelock when the processor has illegally repeated an instruction; and transition logic configured to cause the processor to transition to a safe state when livelock has been detected by the detection logic.

19 Claims, 10 Drawing Sheets

(51) Int. Cl.
*G06F 9/30* (2018.01)
*G06F 11/00* (2006.01)
*G06F 9/52* (2006.01)

(52) U.S. Cl.
CPC .......... *G06F 9/3861* (2013.01); *G06F 9/3865* (2013.01); *G06F 9/3867* (2013.01); *G06F 11/00* (2013.01); *G06F 9/524* (2013.01)

(56) References Cited

U.S. PATENT DOCUMENTS

| | | | |
|---|---|---|---|
| 6,931,477 | B2 | 8/2005 | Oakley et al. |
| 8,112,615 | B1 | 2/2012 | Beard |
| 10,552,155 | B2* | 2/2020 | Darbari ............... G06F 9/30145 |
| 2004/0215933 | A1 | 10/2004 | Nguyen et al. |
| 2007/0083795 | A1 | 4/2007 | Kudelski |
| 2007/0245350 | A1* | 10/2007 | Abernathy .............. G06F 9/524 |
| | | | 718/102 |
| 2008/0065873 | A1 | 3/2008 | Hall et al. |
| 2008/0071955 | A1 | 3/2008 | Johns et al. |
| 2008/0162886 | A1 | 7/2008 | Saha et al. |
| 2008/0301374 | A1 | 12/2008 | Hall et al. |
| 2009/0100432 | A1 | 4/2009 | Holloway et al. |
| 2009/0144588 | A1 | 6/2009 | Pothireddy et al. |
| 2010/0180102 | A1 | 7/2010 | Almog et al. |
| 2012/0144119 | A1 | 6/2012 | Serebrin et al. |
| 2012/0144120 | A1 | 6/2012 | Serebrin et al. |
| 2012/0144128 | A1 | 6/2012 | Serebrin et al. |
| 2014/0089931 | A1 | 3/2014 | Burns et al. |

FOREIGN PATENT DOCUMENTS

| | | |
|---|---|---|
| JP | 03292545 A * | 12/1991 |
| WO | 2015/123048 A1 | 8/2015 |

* cited by examiner

LIVELOCK RECOVERY CIRCUIT FOR DETECTING ILLEGAL REPETITION OF AN INSTRUCTION AND TRANSITIONING TO A KNOWN STATE

PRIORITY

This is a continuation under 35 U.S.C. 120 of copending application Ser. No. 15/340,554 filed Nov. 1, 2016, which claims foreign priority under 35 U.S.C. 119 from United Kingdom Application No. 1610735.1 filed Jun. 20, 2016.

BACKGROUND

Integrated circuits, such as system-on-chips (SoCs), typically implement one or more complex finite state machines (FSMs) which transition between states in response to input events and/or based on a computation on the internal state of the FSM.

The interplay between input events and computations based on the internal state of the FSM often results in dependencies, hazards and race conditions resulting in the FSM being in a livelock or a deadlock. A FSM is in deadlock if it has reached a state where no combination of inputs, or combination of internal state interactions, will cause the state to be exited (i.e. it is not possible to transition out of the state). In contrast, a FSM is in livelock if it can transition between states (i.e. it is not stuck in a single state as with deadlock), but it infinitely cycles through the same set of states. For example, a FSM that infinitely cycles through three states A, B and C (e.g. A→B→C→A→B→C . . . ) is said to be in livelock.

The embodiments described below are provided by way of example only and are not limiting of implementations which solve any or all of the disadvantages of known methods and systems for detecting livelock in an integrated circuit.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described herein are livelock recovery circuits configured to detect livelock in a processor, and cause the processor to transition to a known safe state when livelock is detected. The livelock recovery circuits include detection logic configured to detect that the processor is in livelock when the processor has illegally repeated an instruction; and transition logic configured to cause the processor to transition to a safe state when livelock has been detected by the detection logic.

A first aspect provides a livelock recovery circuit for a processor, the livelock recovery circuit comprising: detection logic configured to monitor one or more control signals of the processor to detect if the processor illegally repeats an instruction; and transition logic configured to, in response to the detection logic detecting that the processor has illegally repeated an instruction, cause the processor to transition to a known state.

A second aspect provides a method of recovering a processor from livelock, the method comprising: monitoring, using a livelock recovery circuit, one or more control signals of the processor to detect when the processor has illegally repeated an instruction; and in response to detecting that the processor has illegally repeated an instruction, causing, using the livelock recovery circuit, the processor to transition to a known state.

A third aspect provides a computer system comprising a processor and the livelock recovery circuit of the first aspect.

A fourth aspect provides computer readable code configured to perform the following steps when the code is run on a computer: monitor one or more control signals of a processor to detect when the processor has illegally repeated an instruction; and in response to detecting that the processor has illegally repeated an instruction, cause the processor to transition to a known state.

The livelock recovery circuit may be embodied in hardware on an integrated circuit. There may be provided a method of manufacturing, at an integrated circuit manufacturing system, a livelock recovery circuit. There may be provided an integrated circuit definition dataset that, when processed in an integrated circuit manufacturing system, configures the system to manufacture a livelock recovery circuit. There may be provided a non-transitory computer readable storage medium having stored thereon a computer readable description of an integrated circuit that, when processed, causes a layout processing system to generate a circuit layout description used in an integrated circuit manufacturing system to manufacture a livelock recovery circuit.

There may be provided an integrated circuit manufacturing system comprising: a non-transitory computer readable storage medium having stored thereon a computer readable integrated circuit description that describes the livelock recovery circuit; a layout processing system configured to process the integrated circuit description so as to generate a circuit layout description of an integrated circuit embodying the livelock recovery circuit; and an integrated circuit generation system configured to manufacture the livelock recovery circuit according to the circuit layout description.

There may be provided computer program code for performing a method as described herein. There may be provided non-transitory computer readable storage medium having stored thereon computer readable instructions that, when executed at a computer system, cause the computer system to perform the method as described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings, in which.

Figure 1:
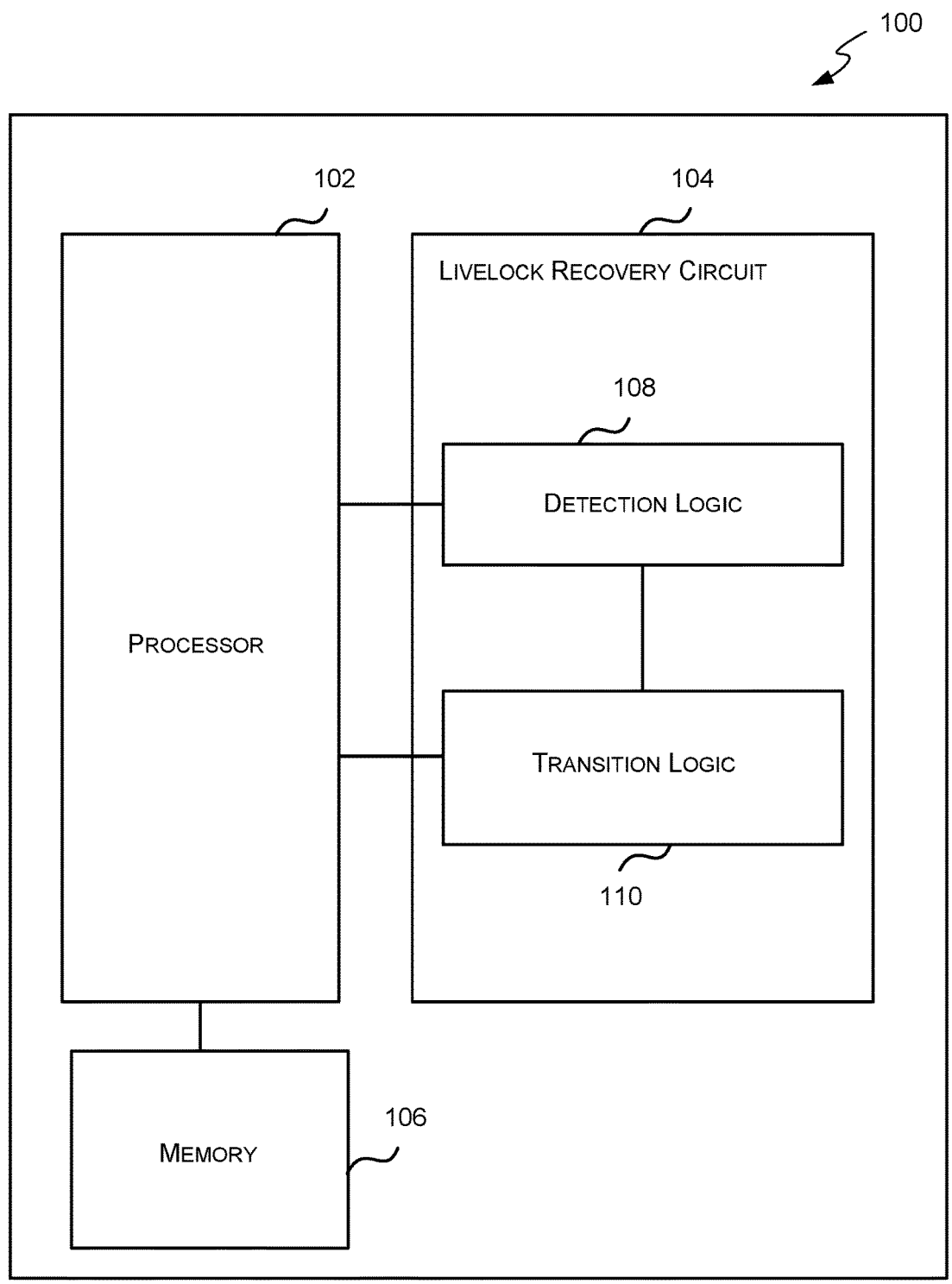
FIG. 1 is a block diagram of an example computer system comprising a processor with a livelock recovery circuit.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

As described above, the interplay between input events and computations based on the internal state of a FSM often results in dependencies, hazards and race conditions resulting in the FSM being in a livelock or a deadlock. A FSM is in deadlock if it has reached at state where no combination of inputs, or combination of internal state interactions will cause the state to be exited (i.e. it is not possible to transition out of the state). In contrast, a FSM is in livelock if it can transition between states (i.e. it is not stuck in a single state as with deadlock), but it infinitely cycles through the same set of sets. For example, a FSM that infinitely cycles through three states A, B and C (e.g. A→B→C→A→B→C . . . ) is said to be in livelock.

An integrated circuit, such as a processor, comprising one or more FSMs may end up in livelock because, for example, there is a flaw in the design of the integrated circuit. These causes of livelock may be identified through verification of the hardware design for the integrated circuit prior to synthesizing the hardware design. An example method to detect livelock in a hardware design is described in the Applicant's co-pending application Ser. No. 15/340,638 filed on the same day as the present application, now U.S. Pat. No. 10,346,571 and entitled "LIVELOCK DETECTION IN A HARDWARE DESIGN USING FORMAL EVALUATION LOGIC". However, integrated circuits may also end up in livelock through malicious activity. For example, a Trojan (i.e. malicious code) in the firmware running on the hardware may cause the hardware to go into livelock. This may occur if the malicious code causes the hardware to execute a sequence of instructions that result in the hardware looping between a sequence of states from which it cannot get out of. These causes of livelock typically can't be detected in advance through verification. Accordingly there is a desire to be able to develop hardware that is resilient against such causes of livelock.

Described herein are livelock recovery circuits configured to detect livelock in a processor, and cause the processor to transition to a known safe state when livelock is detected. The livelock recovery circuits include detection logic configured to detect that the processor is in livelock when the processor has repeatedly fetched or executed the same instruction in an invalid manner (which is also referred to herein as invalidly repeating an instruction); and transition logic configured to cause the processor to transition to a safe state when a livelock has been detected by the detection logic.

Reference is now made to FIG. 1 which illustrates an example computer system 100 comprising a processor 102 with a livelock recovery circuit 104 for detecting when the processor 102 is in livelock, and causing the processor 102 to transition out of the detected livelock.

As is known to those of skill in the art, a processor 102 fetches instructions from a program stored in memory 106, decodes the fetched instructions, executes the decoded instructions, and stores/commits the results of the executed instructions in memory and/or registers. The processor 102 may be any kind of device, machine or dedicated circuit, or collection or portion thereof, with processing capability such that it can execute instructions. The processor 102 may be a pipelined or un-pipelined processor, a single-threaded or multi-threaded processor, an in-order or out-of-order processor or any combination thereof.

A processor may be any kind of general purpose or dedicated processor, such as a CPU, GPU, System-on-chip, state machine, media processor, an application-specific integrated circuit (ASIC), a programmable logic array, a field-programmable gate array (FPGA), physics processing units (PPUs), radio processing units (RPUs), digital signal processors (DSPs), general purpose processors (e.g. a general purpose GPU), microprocessors, any processing unit which is designed to accelerate tasks outside of a CPU, etc.

Although the computer system 100 of FIG. 1 comprises a single processor 102, other computer systems may comprise more than one processor. Those skilled in the art will realize that such processing capabilities are incorporated into many different devices and therefore the term 'computer system' includes set top boxes, media players, digital radios, PCs, servers, mobile telephones, personal digital assistants and many other devices.

The livelock recovery circuit 104 is configured to detect when the processor 102 is in livelock and then aid the processor 102 in recovering from the livelock by causing, or forcing, the processor 102 to transition to a known good state. The livelock recovery circuit 104 comprises detection logic 108 and transition logic 110.

The detection logic 108 is configured to monitor one or more control signals of the processor 102 over two more clock cycles to detect when the processor 102 is in livelock. In particular, the detection logic 108 is configured to determine that the processor 102 is in livelock when it detects, from the one or more control signals, that the processor 102 has illegally repeated the same instruction. A processor 102 has illegally repeated the same instruction if it has fetched and/or executed the same instruction two or more times in a manner that indicates that the processor is in livelock. In particular, an instruction is considered to be illegally repeated by a processor 102 if: (i) the frequency of repetition of the instruction by the processor 102 is greater than a threshold, or (ii) the processor 102 repeats the instruction more than a threshold number of times within a particular period. The particular period may be defined by a start event and a stop event.

In some cases a processor 102 may be deemed to have illegally repeated the same instruction if the processor 102 fetches, or executes, the same instruction two or more times within a predetermined number of fetch events, or execution events. For example, where the processor is a single-cycle non-pipelined processor the processor may be deemed to have illegally repeated the same instruction if the processor fetches an instruction from the same address in two consecutive instruction fetches. Where, however, the processor is a pipelined processor, the processor may be deemed to have illegally repeated the same instruction if the processor fetches an instruction from the same address two or more times within a predetermined number of consecutive instruction fetches.

In these cases, the detection logic 108 may be configured, for example, to detect when the processor is fetching an instruction and to determine that the processor 102 is in livelock if the processor 102 fetches an instruction from the same address within the predetermined number of instruction fetches, where the predetermined number may be one or more than one. The detection logic 108 may be configured to determine whether the processor 102 has fetched an instruction from the same address within the predetermined number of instruction fetches by storing the program counter value associated with the most recent predetermined number of instruction fetches and comparing a program counter value associated with a current instruction fetch to the stored program counter values to determine whether there is a match. This allows the detection logic 108 to detect, for example, an instruction that jumps or branches to itself (i.e. an instruction that loops back to itself).

In other cases, a processor 102 may be deemed to have illegally repeated the same instruction if the processor 102 fetches or executes the same instruction more than a predetermined number of times between a start event and a stop event. In these cases, the detection logic 108 may be configured, for example, to detect the start event, stop event and count the number of times an instruction is fetched from the same address between the start event and the stop event and detect that the processor 102 is in livelock if the count is greater than the predetermined number. In some cases the start event and the stop event may be the processor being in the idle state.

The specific control signals that are monitored by the detection logic 108, and the status thereof that indicate that the processor 102 has illegally repeated the same instruction (and thus is in livelock), will depend on the specific processor 102 being monitored and the specific definition of illegal repetition of an instruction.

Once the detection logic 108 has detected that the processor is in livelock, the transition logic 110 is configured to cause the processor 102 to transition to a known safe state. A known safe state is a state that the livelock recovery circuit 104 knows has not been compromised and allows the processor 102 to progress. The specific known safe state or states will depend on the specific processor 102 being monitored. For example, in some cases the transition logic 110 may be configured to cause the processor 102 to transition into an idle state or a post-reset state. In other cases the transition logic 110 may be configured to cause an interrupt to invoke a known exception handler.

The transition logic 110 may be configured to cause the processor 102 to transition to the known safe state in any known manner. In some cases the processor 102 may comprise a state tracking mechanism for tracking the state of the processor 102. For example, the state tracking mechanism may be a state machine which uses (signal, value) pairs to move the state machine into different states. In these cases the transition logic 110 may be configured to cause the processor 102 to transition to a particular state by setting a particular signal to a known value.

For example, where the processor 102 is a power management unit (PMU) the processor 102 may comprise a state machine which is moved into the PMU's next assigned state each cycle. However, if livelock is detected, the transition logic 110 may be configured to override the assigned state by causing the state machine to move into, for example, an idle state where the processor 102 awaits further external interaction.

Example implementations for the livelock recovery circuit 104 will be described below with reference to FIGS. 3, 5 and 8.

Figure 2:
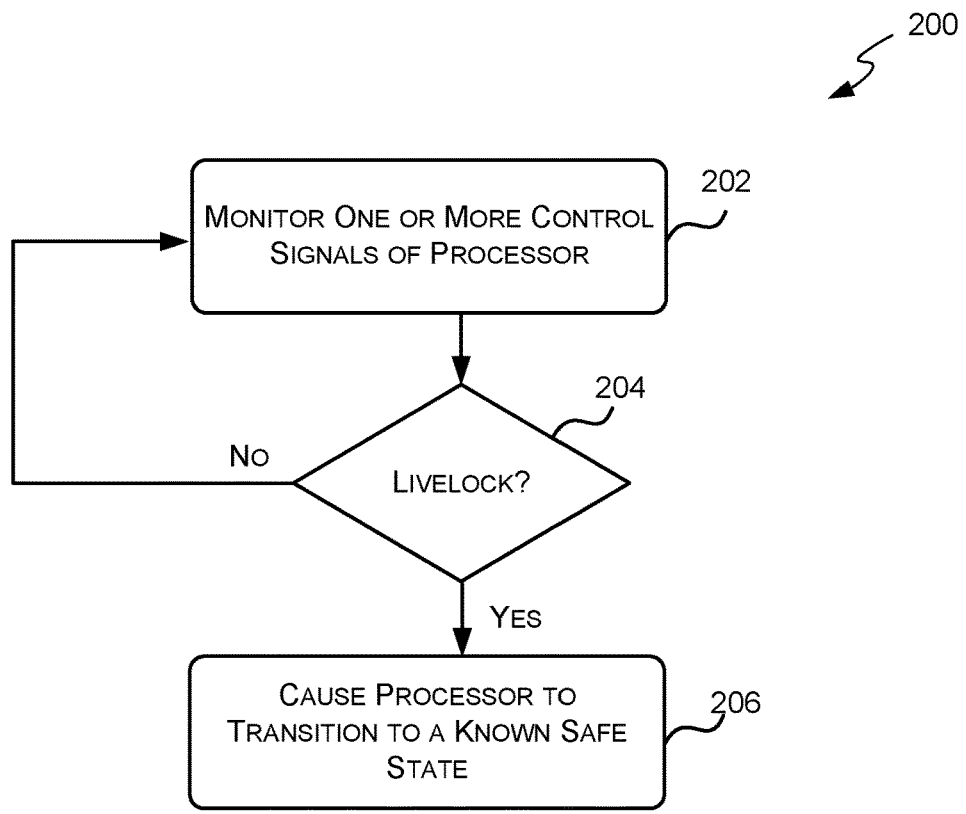
FIG. 2 is a flow diagram of an example method for detecting, and recovering from, livelock using the livelock recovery circuit of FIG. 1.

Reference is now made to FIG. 2 which illustrates an example method 200 for detecting, and recovering from, livelock in a processor 102 which may be implemented by the livelock recovery circuit 104 of FIG. 1.

The method 200 begins at block 202 where the detection logic 108 monitors one or more relevant control signals of the processor 102. Monitoring the one or more relevant controls signals may comprise sampling some or all of the relevant control signals over one or more clock cycles. As described above, the relevant control signals that are monitored will depend on the processor 102 being monitored and the specific definition of illegal instruction repetition.

At block 204, the detection logic 108 determines based on the status of the monitored control signal(s) whether the processor 102 is in livelock. In particular, the detection logic 108 determines based on the status of the monitored control signals(s) whether the processor 102 has illegally repeated an instruction.

As described above, in some cases the detection logic 108 may be configured to determine that the processor 102 has illegally repeated an instruction if the processor fetches or executes the same instruction two or more times within a predetermined number of fetch events or execution events. In these cases the detection logic 108 may be configured to determine that the processor 102 has illegally repeated an instruction by storing the program counter values associated with the most recent predetermined number of instruction fetches and comparing the program counter value of a current instruction fetch to the stored program counter values. In other cases, the detection logic 108 may be configured to determine that the processor 102 has illegally repeated an instruction if the processor 102 fetches or executes the same instruction more than a predetermined number of times between a start event and a stop event.

If the detection logic 108 determines that the processor 102 has illegally repeated an instruction, and thus the processor 102 is in livelock, the method 200 proceeds to block 206. If, however, the detection logic 108 does not determine that the processor 102 has illegally repeated an instruction, the method 200 proceeds back to block 202 where the detection logic 108 continues to monitor the one or more relevant control signals.

At block 206, once the detection logic 108 has detected that the processor has illegally repeated an instruction, and thus the processor 102 is in livelock, the transition logic 110 causes the processor 102 to transition to a known safe state. As described above, a known safe state is any state of the processor 102 in which the livelock recovery circuit 104 knows has not been comprised and will move the processor 102 out of the livelock. For example, the transition logic 110 may cause the processor 102 to transition to an idle state. Once the transition logic 110 has caused the processor 102 to transition to a known safe state the method 200 may end or the method 200 may return to block 202 where the detection logic 108 continues to monitor the relevant control signals.

Figure 3:
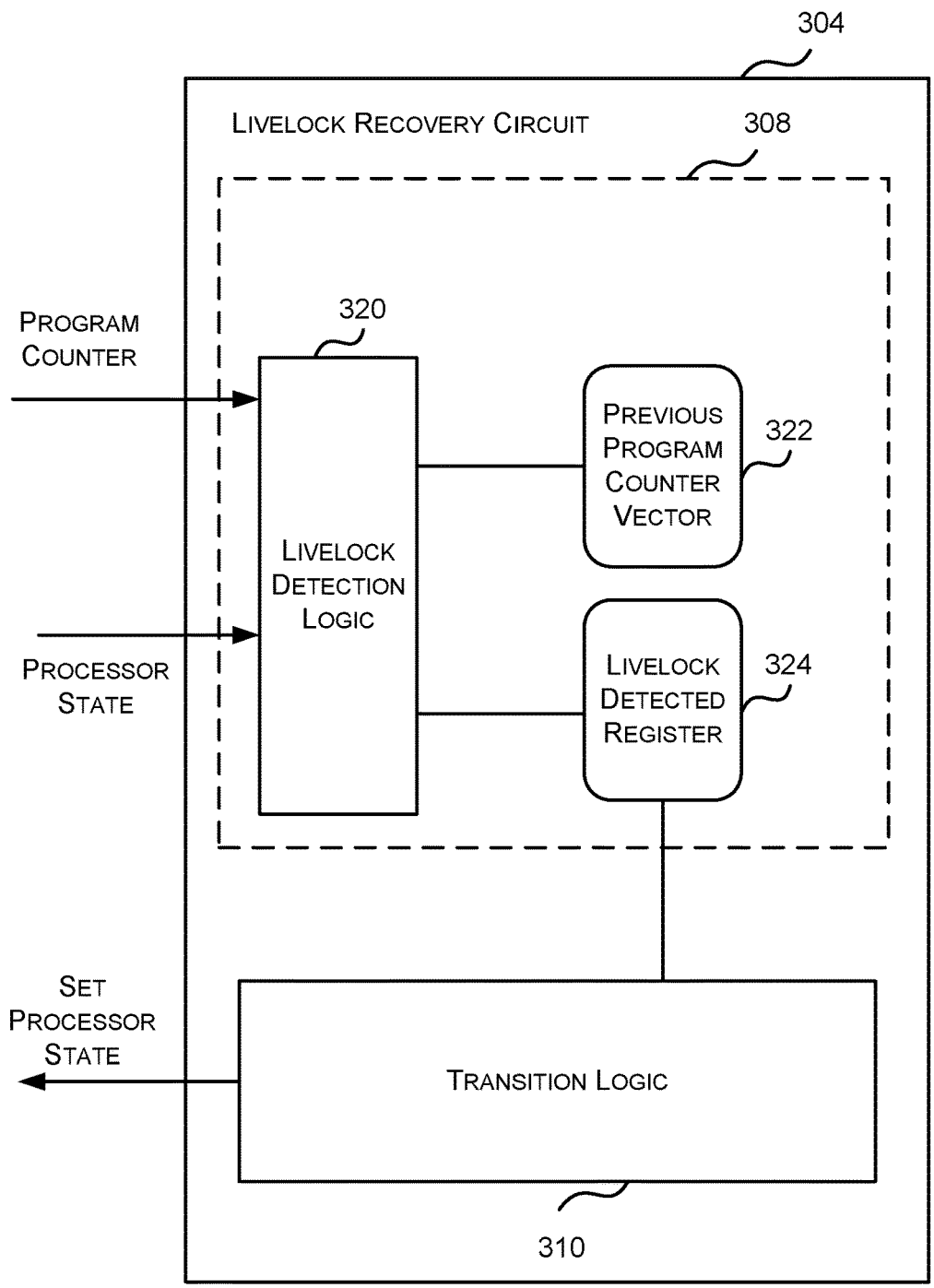
FIG. 3 is a block diagram of a first example livelock recovery circuit.

Reference is now made to FIG. 3 which illustrates a first example implementation of a livelock recovery circuit 304, which may be used as livelock recovery circuit 104 for detecting, and recovering from, livelock in a single-cycle non-pipelined processor. The livelock recovery circuit 304 of FIG. 3 detects livelock in the processor 102 when the processor fetches an instruction from the same address in two consecutive instruction fetches. When this occurs in a single cycle non-pipelined processor it indicates that such an instruction is looping back to itself. As a result, the processor will be in livelock where it will continue to execute that instruction repeatedly unless the processor is transitioned out of that state.

The livelock recovery circuit 304 comprises detection logic 308 for detecting when the processor is in livelock and transition logic 310 for causing the processor to transition to a known safe state.

The detection logic 308 is configured to detect that the processor is in livelock when the processor has fetched an instruction from the same address in two consecutive instruction fetches. The detection logic 308 comprises livelock detection logic 320 which monitors one or more control signals that indicate the current value of the processor's program counter and the current state of the processor. As is known to those of skill in the art, the program counter (PC) of a processor tells the processor where in memory to fetch the next instruction for execution from. In particular, the PC typically indicates an address in memory from which the next instruction should be fetched. Then when the processor is in the fetch state the processor fetches an instruction from the address in memory pointed to by the PC.

In this example, the processor being monitored will be in one of a set of predetermined states including, but not necessarily limited to, fetch, decode, execute and idle, however, it will be evident to a person of skill in the art that this is an example only and that the techniques and methods described herein may be applied to other processors that can be in a different set of states. The one or more control signals monitored by the livelock detection logic 320 indicate which state the processor is currently in.

If the livelock detection logic 320 detects (from the one or more monitored control signals) that the processor is currently in the fetch state (i.e. it is fetching an instruction) then the livelock detection logic 320 compares the current value of the program counter to the value of the program counter associated with the immediately preceding instruction fetch. If the current program counter value is the same as the previous program counter value then an instruction has been fetched from the same address in two consecutive instruction fetches and the livelock detection logic 320 generates an indication that livelock has been detected. In the example of FIG. 3 the livelock detection logic 320 is configured to set a livelock detected register 324 to indicate that the processor has been detected to be in livelock. However, in other examples the livelock detection logic 320 may generate a signal that indicates livelock has been detected.

The livelock detection logic 320 is also configured to save the current value of the program counter in a previous program counter vector 322 so that it can be compared to the program counter value associated with the next fetch state.

The transition logic 310 is configured to, upon determining that the detection logic 308 has detected that the processor is in livelock, cause the processor to transition to a known safe state. In some cases, the transition logic 310 is configured to determine that the detection logic 308 has detected that the processor is in livelock based on the status of the livelock detected register 324. For example, in some cases the transition logic 310 is configured to determine that the detection logic 308 has detected that the processor is in livelock when the livelock detected register 324 is set and to determine that the detection logic 308 has not detected that the processor is in livelock otherwise.

Once the transition logic 310 has determined that the detection logic 308 has detected that the processor is in livelock the transition logic 310 causes the processor to transition to a safe state. In the example shown in FIG. 3 the transition logic 310 is configured to cause the processor to transition to a safe state by setting the state of the processor to be in the idle state.

As described above, in some cases the processor 102 may comprise a state tracking mechanism for tracking the state of the processor 102. For example, the state tracking mechanism may be a state machine which uses (signal, value) pairs to move the state machine into different states. In these cases the transition logic 310 may be configured to cause the processor 102 to transition to a particular state by setting a particular signal to a known value.

For example, where the processor 102 is a power management unit (PMU) the processor 102 may comprise a state machine which is moved into the PMU's next assigned state each cycle. However, if livelock is detected, the transition logic 310 may be configured to override the assigned state by causing the state machine to move into, for example, an idle state where the processor 102 awaits further external interaction.

In some cases, causing the processor 102 to transition to an idle state may also include clearing and/or setting one or more registers to ensure that the processor 102 can start processing instructions from a known point.

It will be evident to a person of skill in the art that this is an example only and the transition logic 310 may be configured to cause the processor to transition to another known safe state and/or in another manner.

Although not shown in FIG. 3, it will be evident to a person of skill in the art that the logic blocks (e.g. livelock detection logic 320 and transition logic 310) may be triggered by a clock. For example, one or more of the logic blocks may be triggered by the rising or positive edge of the clock. Furthermore, it will be evident to a person of skill in the art that one or more of the logic blocks (e.g. livelock detection logic 320 and transition logic 310) may be combined or their functionality may divided between logic blocks in another manner.

Figure 4:
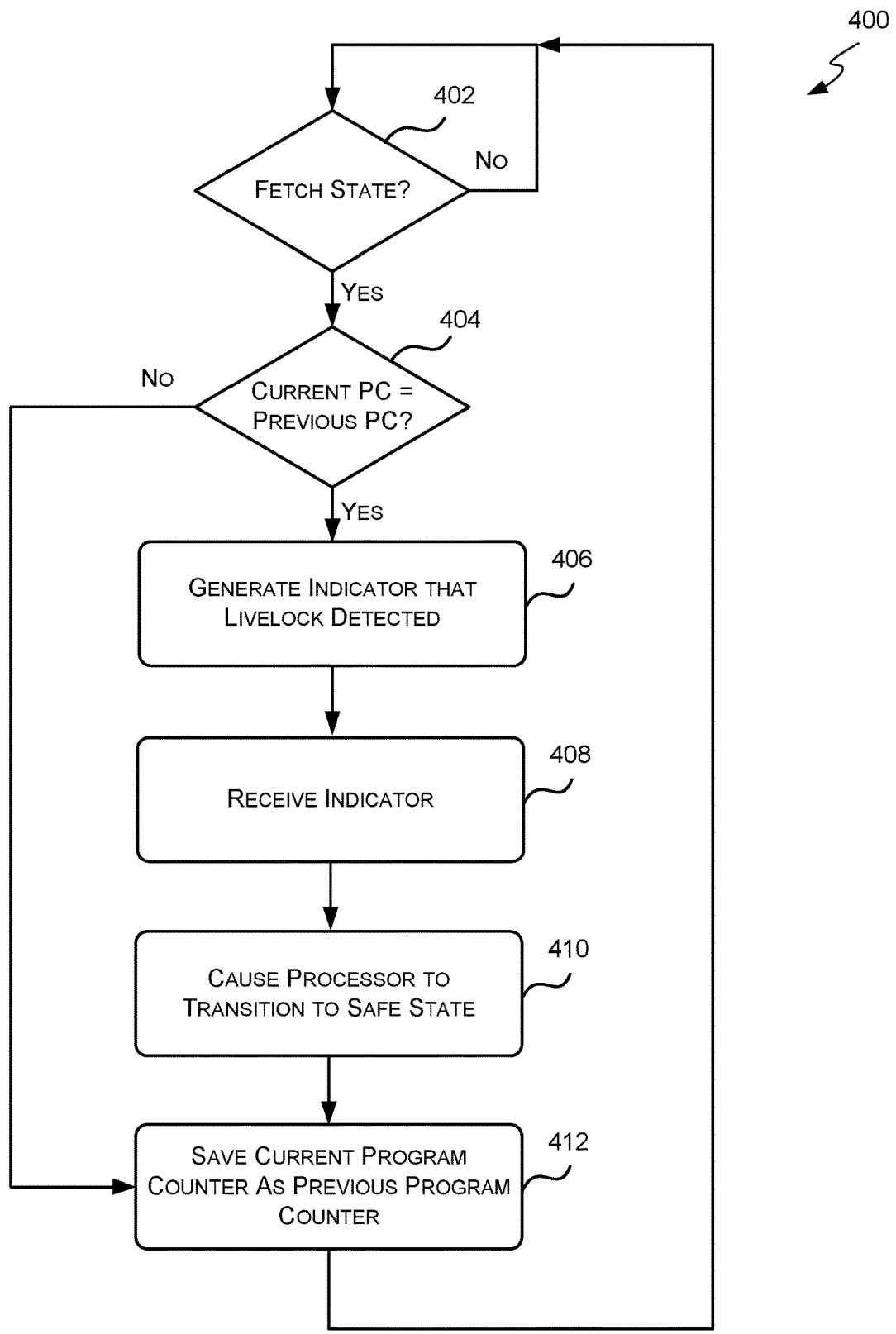
FIG. 4 is a flow diagram of an example method for detecting, and recovering from, livelock using the livelock recovery circuit of FIG. 3.

Reference is now made to FIG. 4 which illustrates an example method 400 for detecting, and recovering from, livelock in a processor which may be implemented by the livelock recovery circuit 304 of FIG. 3. The method 400 detects that a single cycle non-pipelined processor is in livelock if the processor has fetched an instruction from the same address in two consecutive fetch states.

The method 400 begins at block 402 where the livelock detection logic 320 determines whether the processor is currently in the fetch state. In some cases the livelock detection logic 320 may determine whether the processor is currently in the fetch state based on the status of one or more relevant control signals of the processor. For example, the livelock detection logic 320 may be configured to sample the one or more relevant control signals. If the livelock detection logic 320 determines that the processor is currently in the fetch state then the method 400 proceeds to block 404. If, however, the livelock detection logic 320 determines that the processor is not currently in the fetch state then the method 400 proceeds back to block 402.

At block 404, after detecting that the processor is in the fetch state, the livelock detection logic 320 determines whether the current value of the program counter is equal to the value of the program counter in the previous fetch state. The livelock detection logic may be configured to sample the program counter and compare the sampled value to the program counter value associated with the previous fetch state (which is stored in a memory unit, such as the previous program counter vector 322 of FIG. 3).

If the current value of the program counter matches the program counter value associated with the previous fetch state then the processor has fetched an instruction from the same address in memory in two consecutive fetch states thus the processor is likely in livelock and the method 400 proceeds to block 406. If, however, the current value of the program counter does not match the program counter value associated with the previous fetch state then livelock is not detected and the method 400 proceeds to block 412.

At block 406, the livelock detection logic 320 generates an indicator that livelock has been detected. In some cases, the livelock detection logic may set a register, such as the livelock detected register 324, to indicate that livelock has been detected. In other cases, the livelock detection logic 320 may output a livelock detected signal indicating that livelock has been detected. Once the livelock detection logic has generated the indicator that livelock has been detected, the method 400 proceeds to block 408.

At block 408, the transition logic 310 receives the indicator generated by the livelock detection logic 320 that livelock has been detected. For example, the transition logic 310 may read the value of the livelock detected register 324, or the transition logic 310 may receive the generated livelock detected signal. Once the transition logic 310 has received the indicator that livelock has been detected, the method 400 proceeds to block 410.

At block 410, the transition logic 310 causes the processor to transition to a known safe state. In some cases, the transition logic 310 causes the processor to transition to an idle state by setting the state of the processor to idle. However, it will be evident to a person of skill in the art that this is an example only and the transition logic 310 may cause the processor to transition to another known safe state and/or in another manner. Once the transition logic 310 cause the processor to transition to a known safe state the method 400 proceeds to block 412.

At block 412, the livelock detection logic 320 saves the current value of the program counter in memory so that it can be compared with the program counter value associated with the next fetch state. For example, the livelock detection logic 320 may save the current value of the program counter in a vector, such as previous program counter vector 322. Once the livelock detection logic 320 saves the current value of the program counter in memory, the method 400 proceeds back to block 402.

It will be evident to a person of skill in the art that the above method is an example only and the blocks of the method may be executed in another order and some of the blocks may be omitted entirely. For example, in other examples blocks 406 and 408 may be omitted entirely and the method may proceed directly from block 404 to block 410.

Blocks 402 and 412 generally correspond to block 202 of FIG. 2, blocks 404 and 406 generally correspond to block 204 of FIG. 2, and blocks 408 and 410 generally correspond to block 206 of FIG. 2.

Figure 5:
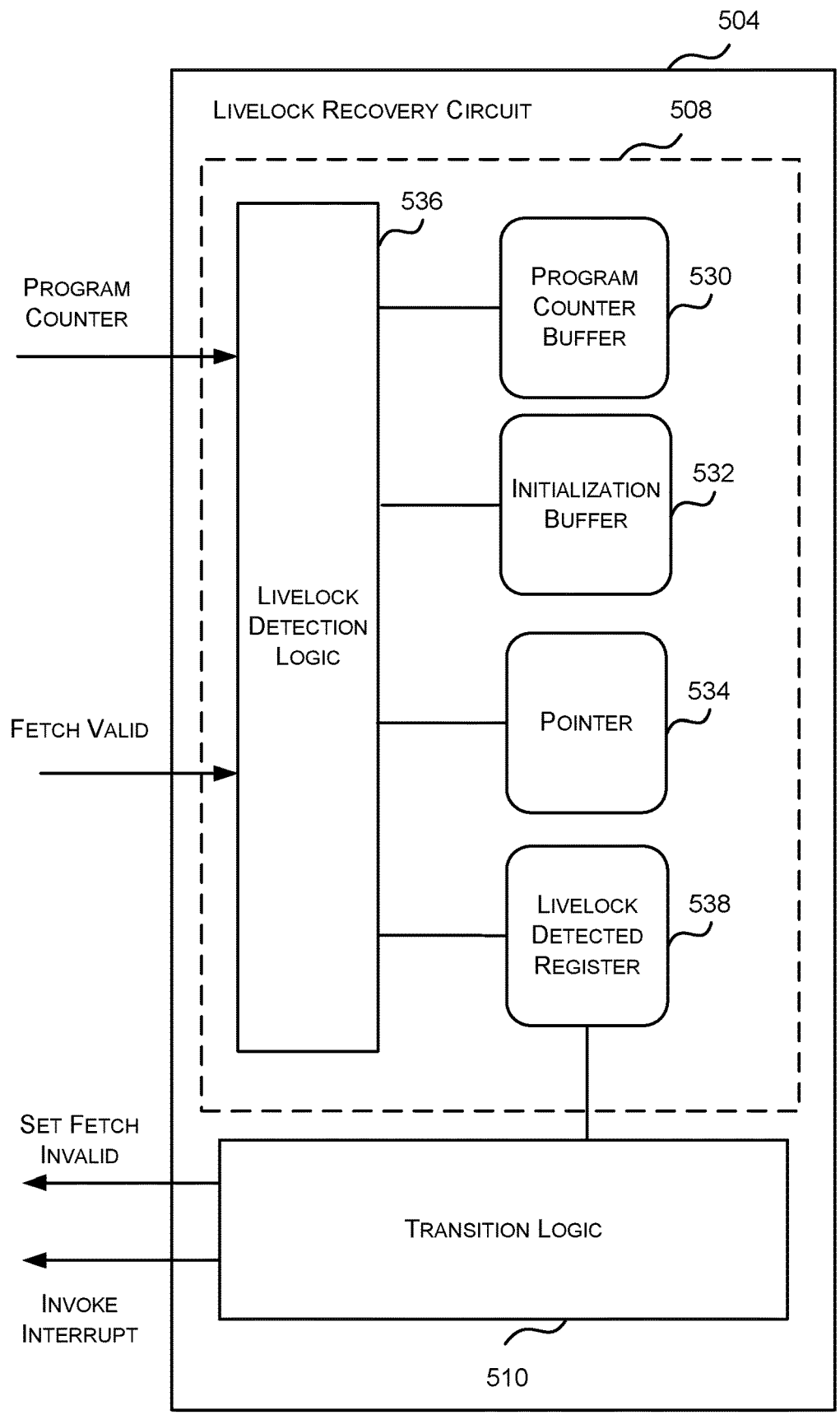
FIG. 5 is a block diagram of a second example livelock recovery circuit.

Reference is now made to FIG. 5 which illustrates a second example implementation of a livelock recovery circuit 504, which may be used as livelock recovery circuit 104 for detecting, and recovering from, livelock in a pipelined processor. The livelock recovery circuit 504 of FIG. 5 detects that the processor 102 is in livelock when the processor fetches an instruction from the same address two or more times within a predetermined number of consecutive fetches.

A single cycle non-pipelined processor fetches and executes a single instruction at a time thus each instruction is executed before the next instruction is fetched. In this way the processor can typically fetch the correct next instruction based on the execution of the current instruction. Therefore, if an instruction causes a jump or loop back to itself then the processor will fetch the same instruction in consecutive instruction fetches or fetch states. Accordingly to determine whether an instruction jumps, or loops back, to itself, the program counter in a particular fetch state can be compared to the program counter in the previous fetch state as described with respect to FIGS. 3 and 4.

However, a pipelined processor typically fetches one or more additional instructions before a particular instruction is executed. For example, a pipelined processor may fetch instructions Y+1, and Y+2 before it executes instruction Y and determines the next instruction for execution is actually Z, not Y+1. Therefore, in a pipelined processor if an instruction causes a jump or loop back to itself there may be a number of fetches between the initial fetch of that instruction to the subsequent fetch of that instruction caused by the loop back to self. Accordingly, in this example the livelock recovery circuit 504 stores the value of the program counter for a plurality of previous instruction fetches to account for the delay in fetching an instruction after a branch instruction. The number of program counter values that are stored is based on the pipeline length and structure.

The livelock recovery circuit 504 of FIG. 5 comprises detection logic 508 for detecting when the processor is in livelock and transition logic 510 for causing the processor to transition to a known safe state.

The detection logic 508 is configured to detect that the processor is in livelock when the processor has fetched an instruction from the same address at least twice within a predetermined number, X, of consecutive fetches. The detection logic 508 stores a copy of the value of the program counter for the X most recent fetches performed by the processor and compares the value of the program counter for each fetch to the stored program counter values to determine if there is a match. If there is a match then likely an instruction has looped back to itself.

In the example of FIG. 5 the detection logic 508 comprises a program counter buffer 530, an initialization buffer 532 and a pointer 534 to store the program counter values for the X most recent fetches performed by the processor. In particular, the program counter buffer 530 comprises X data slots which are each used to store the value of the program counter for a fetch. The pointer 534 points to the data slot of the program counter buffer 530 in which the program counter value for the next fetch is to be stored. Since after a reset the program counter buffer 530 will not typically comprise valid data until at least X fetches have been performed the initialization buffer 532 is used to indicate which of the data slots of the program counter buffer 530 have valid data. For example, the initialization buffer 532 may comprise a single bit for each slot or entry of the program counter buffer 530 which indicates whether or not that slot or entry has valid data.

The detection logic 508 also comprises livelock detection logic 536 that is configured to control the writing to and reading from the program counter buffer 530, initialization buffer 532 and pointer 534; and use the information therein to determine whether the processor is in livelock. The livelock detection logic 536 monitors one or more relevant control signals of the processor that indicate when a fetch has been performed by the processor and indicate the current value of the program counter.

When the one or more monitored control signals indicate that a fetch has been performed, the livelock detection logic 536 compares the current program counter value to the valid entries in the program counter buffer 530. For example, the livelock detection logic 536 determines from the initialization buffer 532 which of the data slots or entries of the program counter buffer 530 hold valid program counter data. The livelock detection logic 536 then compares the value of each of the data slots or entries having valid data to the value of the current program counter.

If the value of the current program counter matches any of the valid entries in the program counter buffer 530 then it is likely that the processor is in livelock and the livelock detection logic generates an indication that livelock has been detected. In the example of FIG. 5 the livelock detection logic 536 is configured to set a livelock detected register or flag 538. For example, the livelock detection logic 536 may be configured to set the livelock detected register 538 to a known value (e.g. "1") to indicate livelock has been detected. In other examples, the livelock detection logic may be configured to output a signal that indicates that livelock has been detected.

After the comparison, the livelock detection logic 536 is configured to store the value of the current program counter in the program counter buffer so that it can be compared against the program counter value for future fetches. To ensure that the program counter buffer 530 holds the value of the program counter associated with the X most recent fetches, the pointer 534 is used to keep track of the data slot or entry of the program counter buffer 530 that contains the oldest entry. The value of the current program counter is then stored in the entry of the program counter buffer 530 pointed to by the pointer 534 and then the pointer 534 is updated to point to the next oldest entry of the program counter buffer 530.

When the current program counter value is stored in the program counter buffer 530 the livelock detection logic 536 is also configured to update the initialization buffer 532 so that the initialization buffer 532 comprises information that indicates the entry or slot just written to has valid data. The relationship between the program counter buffer 530, initialization buffer 532 and pointer 534 will be described in more detail below with reference to FIGS. 6(A) to 6(C).

The transition logic 510 is configured to, upon determining that the detection logic 508 has detected that the processor is in livelock, cause the processor to transition to a known safe state. The transition logic 510 may be configured to determine that the detection logic 508 has detected that the processor is in livelock from the indication generated by the detection logic 508. In the example of FIG. 5, the transition logic 510 is configured to determine that the detection logic 508 has detected that the processor is in livelock based on the status of the livelock detected register 538. For example, the transition logic 510 may determine that the processor is in livelock if the livelock detected register 538 is set. Where the livelock detection logic 508 generates a different indication then the transition logic 510 may base the determination on that indication.

Once the transition logic 510 has determined that the detection logic 508 has detected that the processor is in livelock the transition logic 510 causes the processor to transition to a safe state. In the example shown in FIG. 5 the transition logic 510 is configured to invoke an interrupt (e.g. by driving an interrupt line) to cause the processor to invoke a known exception handler. The transition logic 510 may also be configured to set the current fetch to invalid (e.g. by setting a flag) so that the processor does not execute the invalidly fetched instruction. It will be evident to a person of skill in the art that this is an example only and the transition logic 510 may be configured to put the processor in another known safe state and/or in another manner.

Although, not shown in FIG. 5, it will be evident to a person of skill in the art that the logic blocks (e.g. livelock detection logic 536 and transition logic 510) may be triggered by a clock. For example, one or more of the logic blocks may be triggered by the rising or positive edge of the clock. Furthermore, it will be evident to a person of skill in the art that one or more of the logic blocks (e.g. livelock detection logic 536 and transition logic 510) may be combined or their functionality may divided between logic blocks in another manner.

Figure 6A:
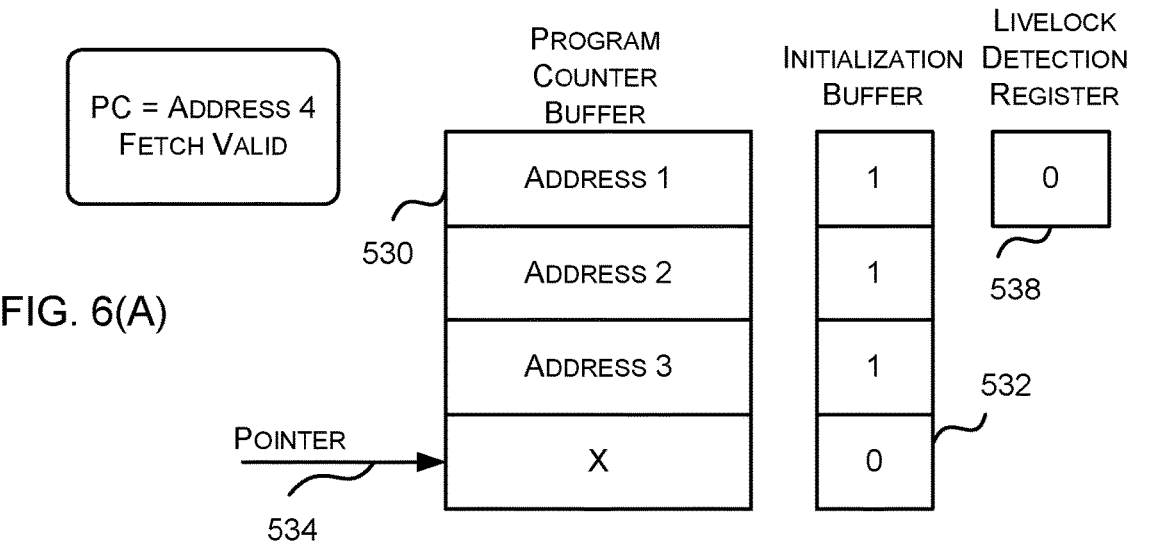
FIGS. 6(A) to 6(C) are schematic diagrams of the program counter buffer and pointer of FIG. 5.
Figure 6B:
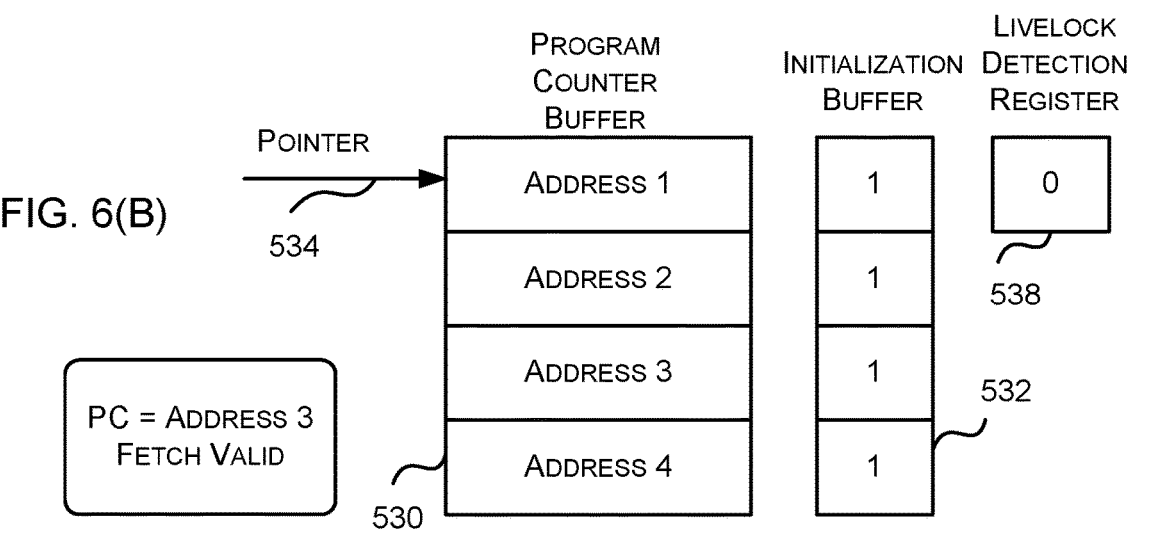
Figure 6C:
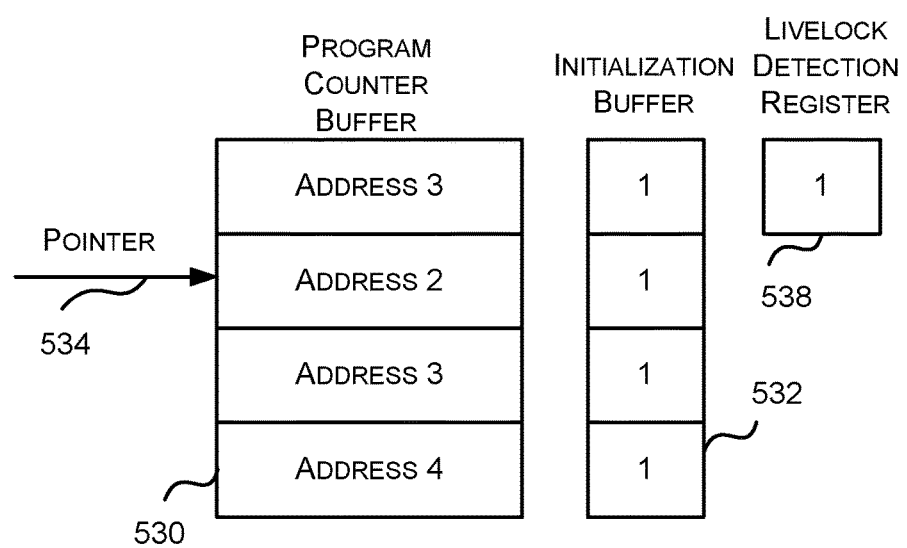

Reference is now made to FIGS. 6(A) to 6(C) which illustrate an example program counter buffer 530, initialization buffer 532 and pointer 534 of FIG. 5. The example program counter buffer 530 of FIGS. 6(A) to 6(C) comprises four data slots or entries, each of which can hold or store the value of the program counter. The initialization buffer 532 comprises a bit for each data entry or slot of the program counter buffer 530 which indicates whether or not there is valid data in that entry or slot. Since there are four entries in the program counter buffer 530 there are four bits in the initialization buffer 532. In this example a "1" indicates that the data in the corresponding entry or slot is valid and a "0" indicates that the data in the corresponding entry or slot of the program counter buffer 530 is not valid, or has not been initialized. The pointer 534 points to the entry or slot of the program counter buffer that has the oldest data or has been written to least recently. In this example the livelock detection register comprises a single bit that is set to "1" when livelock is detected and is set to "0" otherwise.

In FIG. 6(A) the monitored/relevant control signals indicate that a fetch has occurred and the current program counter is set to "Address 4". The livelock detection logic 536 identifies from the initialization buffer 532 that the first three slots or entries of the program counter buffer 530 contain valid data ("Address 1", "Address 2", "Address 3"). The livelock detection logic 536 then compares the current value of the program counter ("Address 4") to these three entries to determine if there is match. There is no match so the livelock detection logic 536 does not set the livelock detection register 538.

After the comparison, the livelock detection logic 536 writes the value of the current program counter ("Address 4") to the slot or entry of the program counter buffer 530 pointed to by the pointer 534 (the fourth slot or entry in this example). Also since the corresponding bit in the initialization buffer 532 (the fourth bit) is not set, the livelock detection logic 536 sets the corresponding bit in the initialization buffer 532 to indicate that this slot or entry of the program counter buffer 530 now holds valid data. The livelock detection logic 536 then updates the pointer 534 to point to the next oldest slot or entry in the program counter buffer 530 (the first slot in this example). These changes are reflected in FIG. 6(B).

In FIG. 6(B) the monitored/relevant control signals indicate that a fetch has occurred and the current program counter is set to "Address 3". The livelock detection logic 536 identifies from the initialization buffer 532 that all four slots or entries of the program counter buffer 530 contain valid data ("Address1", "Address 2", "Address 3", "Address 4"). The livelock detection logic 536 then compares the current value of the program counter ("Address 3") to these four entries to determine if there is a match. There is a match with "Address 3" in the third slot of the program counter buffer 530 so the processor is likely in livelock (e.g. it is likely that an instruction has called or looped back to itself) and the livelock detection logic 536 sets the livelock detection register 538 to "1" as shown in FIG. 6(C).

In some cases, after detecting that the processor is likely in livelock the livelock detection logic 536 writes the value of the current program counter ("Address 3") to the slot or entry of the program counter buffer 530 pointed to by the pointer 534 (the first slot or entry in this example). The livelock detection logic 536 then updates the pointer 534 to point to the next oldest slot or entry in the program counter buffer 530 (the second slot in this example). These changes are shown in FIG. 6(C). However, in other cases, the livelock detection logic 536 may not update the program counter buffer 530 or the pointer 534 after detecting that the processor is likely in livelock.

Figure 7:
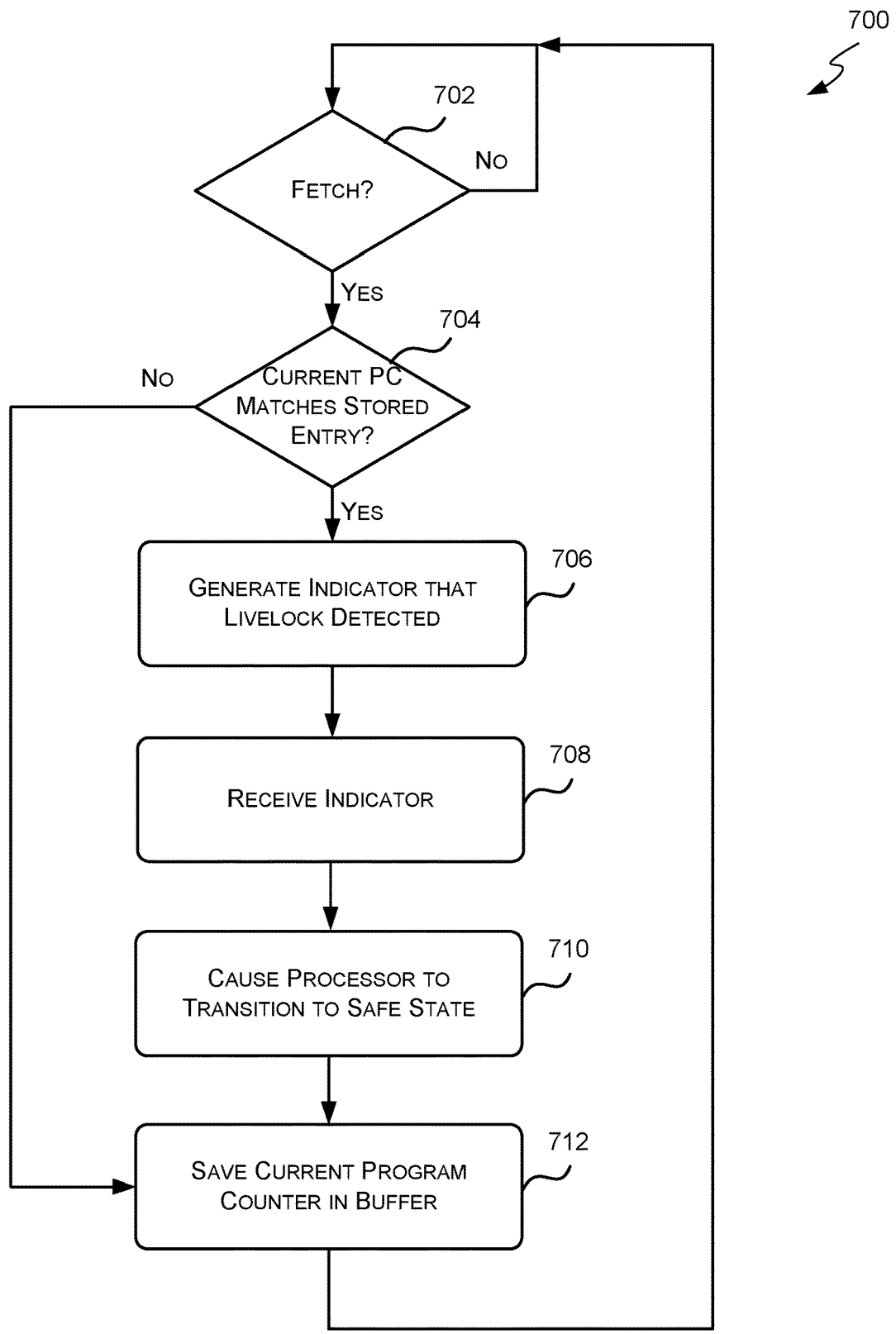
FIG. 7 is a flow diagram of an example method for detecting, and recovering from, livelock using the livelock recovery circuit of FIG. 5.

Reference is now made to FIG. 7 which illustrates an example method 700 for detecting, and recovering from, livelock in a processor which may be implemented by the livelock recovery circuit 504 of FIG. 5. The method 700 detects that a pipelined processor is in livelock if the processor has fetched an instruction from the same address two or more times within a predetermined number of consecutive fetches.

The method 700 begins at block 702 where the livelock detection logic 536 determines whether the processor has currently completed a fetch. In some cases, as shown in FIG. 5, the livelock detection logic 536 may determine whether the processor has completed a fetch based on one or more relevant control signals. For example, the livelock detection logic 536 may be configured to sample the relevant control signal(s) and analyze the status thereof. If the livelock detection logic 536 determines that the processor has completed a fetch the method 700 proceeds to block 704. If, however, the livelock detection logic 536 does not determine that the processor has completed a fetch the method 700 proceeds back to block 702.

At block 704, after detecting that the processor has completed a fetch, the livelock detection logic 536 determines whether the value of the current program counter is equal to the value of the program counter for any of the previous X fetches where X is a predetermined number based on the length and configuration of the pipeline. The livelock detection logic 536 may be configured to sample the current program counter of the processor and compare the sampled value to the program counter values corresponding to the X most recent fetches which were stored in the program counter buffer 530. As described above the livelock detection logic 536 may use the initialization buffer 532 to determine which of the slots or entries of the program counter buffer 530 contain valid data and then compare the data in those slots or entries of the program counter buffer 530 to the value of the current program counter.

If the value of the current program counter matches any of the valid entries in the program counter buffer then the processor has fetched an instruction from the same address in memory within X consecutive fetches thus the processor is likely in livelock and the method 700 proceeds to block 706. If, however, the value of the current program counter does not match any of the valid entries in the program counter buffer then livelock is not detected and the method proceeds to block 712.

At block 706, the livelock detection logic 536 generates an indicator that livelock has been detected. In some cases, the livelock detection logic 536 may set a register, such as the livelock detected register 538, to indicate that livelock has been detected. In other cases, the livelock detection logic 536 may output a livelock detected signal indicating that livelock has been detected. Once the livelock detection logic 536 has generated an indicator that livelock has been detected, the method 700 proceeds to block 708.

At block 708, the transition logic 510 receives the indicator generated by the livelock detection logic 536 that livelock has been detected. For example, the transition logic 510 may read the value of the livelock detected register 538, or the transition logic 510 may receive the generated livelock detected signal. Once the transition logic 510 has received the indicator that livelock has been detected, the method 700 proceeds to block 710.

At block 710, the transition logic 510 causes the processor to transition to a known safe state. In some cases, the transition logic 510 causes the processor to transition to an idle. In other cases the transition logic 510 invokes an interrupt to cause a known exception handler to be executed. However, it will be evident to a person of skill in the art that this is an example only and the transition logic 510 may cause the processor to transition to another known safe state and/or in another manner. Once the transition logic 510 causes the processor to transition to a known safe state the method 700 proceeds to block 712.

At block 712, the livelock detection logic 536 saves the current value of the program counter in memory so that it can be compared with the value of the program counter corresponding to subsequent fetches. For example, the livelock detection logic 536 may save the current value of the program counter in the slot or entry of the program counter buffer 530 pointed to by the pointer 534 and then update the pointer 534 to point to the next oldest entry in the program counter buffer 530. Once the livelock detection logic 536 saves the current value of the program counter in memory (and updates the pointer 534), the method 700 proceeds back to block 702.

It will be evident to a person of skill in the art that the above method is an example only and the blocks of the method may be executed in another order and some of the blocks may be omitted entirely. For example, in other examples blocks 706 and 708 may be omitted entirely and the method may proceed directly from block 704 to block 710.

Blocks 702 and 712 generally correspond to block 202 of FIG. 2, blocks 704 and 706 generally correspond to block 204 of FIG. 2, and blocks 708 and 710 generally correspond to block 206 of FIG. 2.

Figure 8:
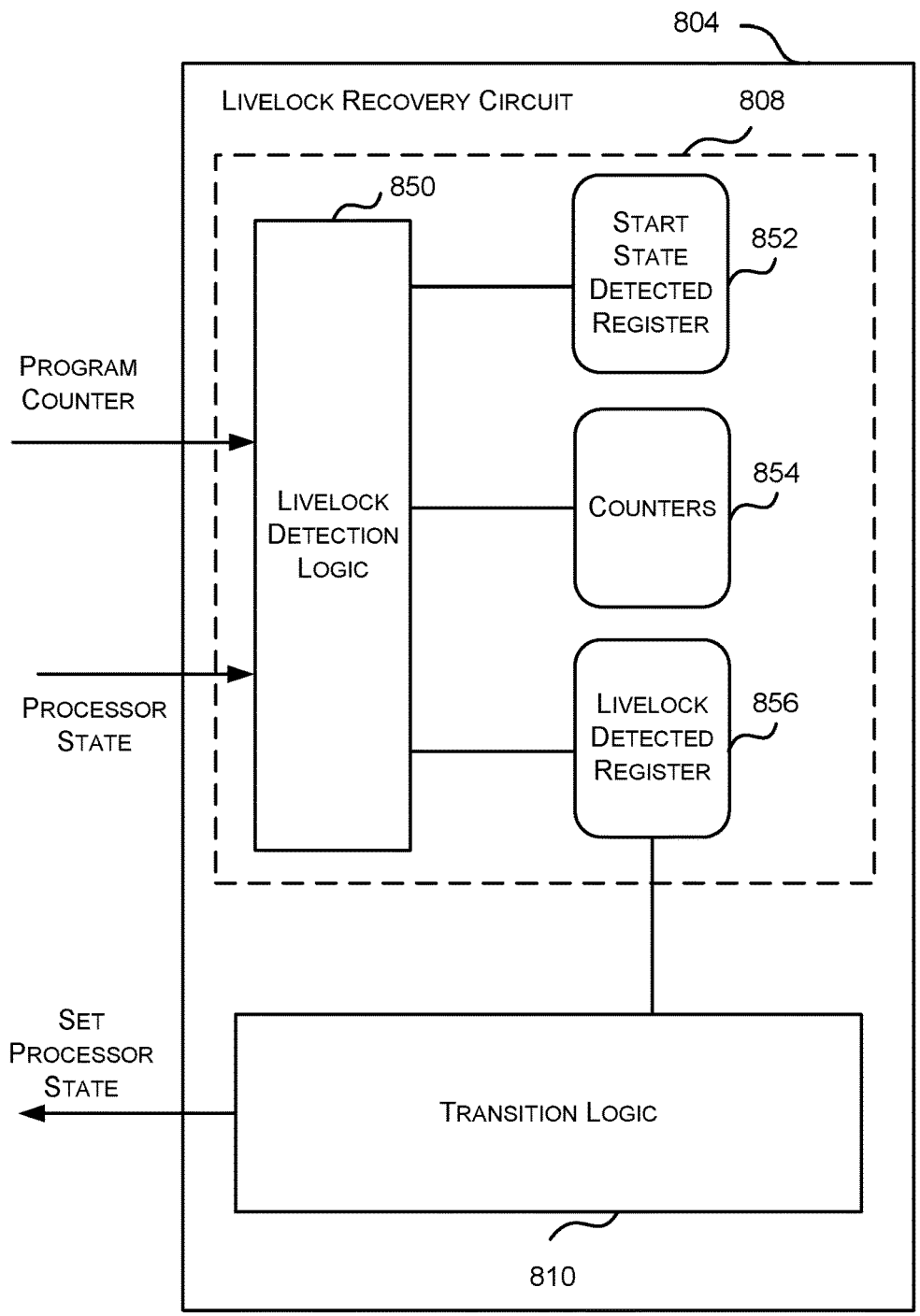
FIG. 8 is a block diagram of a third example livelock recovery circuit.

Reference is now made to FIG. 8 which illustrates a third example implementation of a livelock recovery circuit 804, which may be used as livelock recovery circuit 104 for detecting, and recovering from, livelock in a processor. The livelock recovery circuit 804 of FIG. 8 detects that the processor 102 is in livelock when the processor has fetched an instruction from the same address more than a predetermined number of times between a start event (e.g. being in a start state, such as idle) and a stop event (e.g. being in a stop state such as idle).

The livelock recovery circuit 804 comprises detection logic 808 for detecting when the processor is in livelock and transition logic 810 for causing the processor to transition to a known safe state.

The detection logic 808 is configured to detect that the processor is in livelock when the processor has fetched an instruction from the same address more than a predetermined number of times between a start event (e.g. being in a start state such as idle) and a stop event (e.g. being in a stop state such as idle). The detection logic 808 comprises livelock detection logic 850 which monitors one or more control signals that indicate the current value of the processor's program counter and the current state of the processor, a start state detected register 852 for indicating when the start state has been detected, a plurality of counters 854 for recording how many times an instruction has been fetched from a particular address between the start state and the stop state, and a livelock detected register 856 for indicating when livelock has been detected.

In this example, the processor being monitored will be in one of a set of predetermined states including, but not necessarily limited to, fetch, decode, execute and idle, however, it will be evident to a person of skill in the art that this is an example only and that the techniques and methods described herein may be applied to other processors that can be in a different set of states. The one or more control signals monitored by the livelock detection logic 850 indicate which state the processor is currently in.

If the start state has not already been detected (e.g. based on the status of the start state detected register 852) and the livelock detection logic 850 detects (from the one or more monitored control signals) that the processor is currently in the start state (e.g. idle) then the livelock detection logic 850 sets the start state detected register 852 to indicate that the start state has been detected. In some cases setting the start state detected register 852 to indicate that the start state has been detected may comprise setting the start state detected register 852 to a known value (e.g. "1" or "0").

If the start state has already been detected (e.g. based on the status of the start state detected register 852) and the livelock detection logic 850 detects the processor is currently in the fetch state (i.e. it is fetching an instruction) the livelock detection logic 850 increments a counter 854 associated with the current value of the program counter to indicate that an instruction has been fetched from that address. The livelock detection logic 850 then determines if any of the counters 854 have exceeded the predetermined number.

If any of the counters 854 have exceeded the predetermined number then the same instruction has been fetched too many times between the start state and the stop state (e.g. between idle states) indicating that the processor is likely in livelock and so the livelock detection logic 850 generates an indication that livelock has been detected. In the example of FIG. 8 the livelock detection logic 850 is configured to set a livelock detected register 856 to indicate that the processor has been detected to be in livelock. However, in other examples the livelock detection logic 850 may generate a signal that indicates livelock has been detected.

If the start state has already been detected (e.g. based on the status of the start state detected register 852) and the livelock detection logic 850 detects (from the one or more monitored control signals) that the processor is currently in the stop state (e.g. idle) then the livelock detection logic 850 sets the start state detected register 852 to indicate that the stop state has been detected. The livelock detection logic 850 may also clear the counters 854.

The transition logic 810 is configured to, upon determining that the detection logic 808 has detected that the processor is in livelock, cause the processor to transition to a known safe state. In some cases, the transition logic 810 is configured to determine that the detection logic 808 has detected that the processor is in livelock based on the status of the livelock detected register 856. For example, in some cases the transition logic 810 is configured to determine that the detection logic 808 has detected that the processor is in livelock when the livelock detected register 856 is set to a particular value and to determine that the detection logic 808 has not detected that the processor is in livelock otherwise.

Once the transition logic 810 has determined that the detection logic 808 has detected that the processor is in livelock the transition logic 810 causes the processor to transition to a safe state. In the example shown in FIG. 8 the transition logic 810 is configured to cause the processor to transition to a safe state by setting the state of the processor to be in the idle state. It will be evident to a person of skill in the art that this is an example only and the transition logic 810 may be configured to cause the processor to transition to another known safe state and/or in another manner.

Although, not shown in FIG. 8, it will be evident to a person of skill in the art that the logic blocks (e.g. livelock detection logic 850 and transition logic 810) may be triggered by a clock. For example, one or more of the logic blocks may be triggered by the rising or positive edge of the clock. Furthermore, it will be evident to a person of skill in the art that one or more of the logic blocks (e.g. livelock detection logic 850 and transition logic 810) may be combined or their functionality may divided between logic blocks in another manner.

Figure 9:
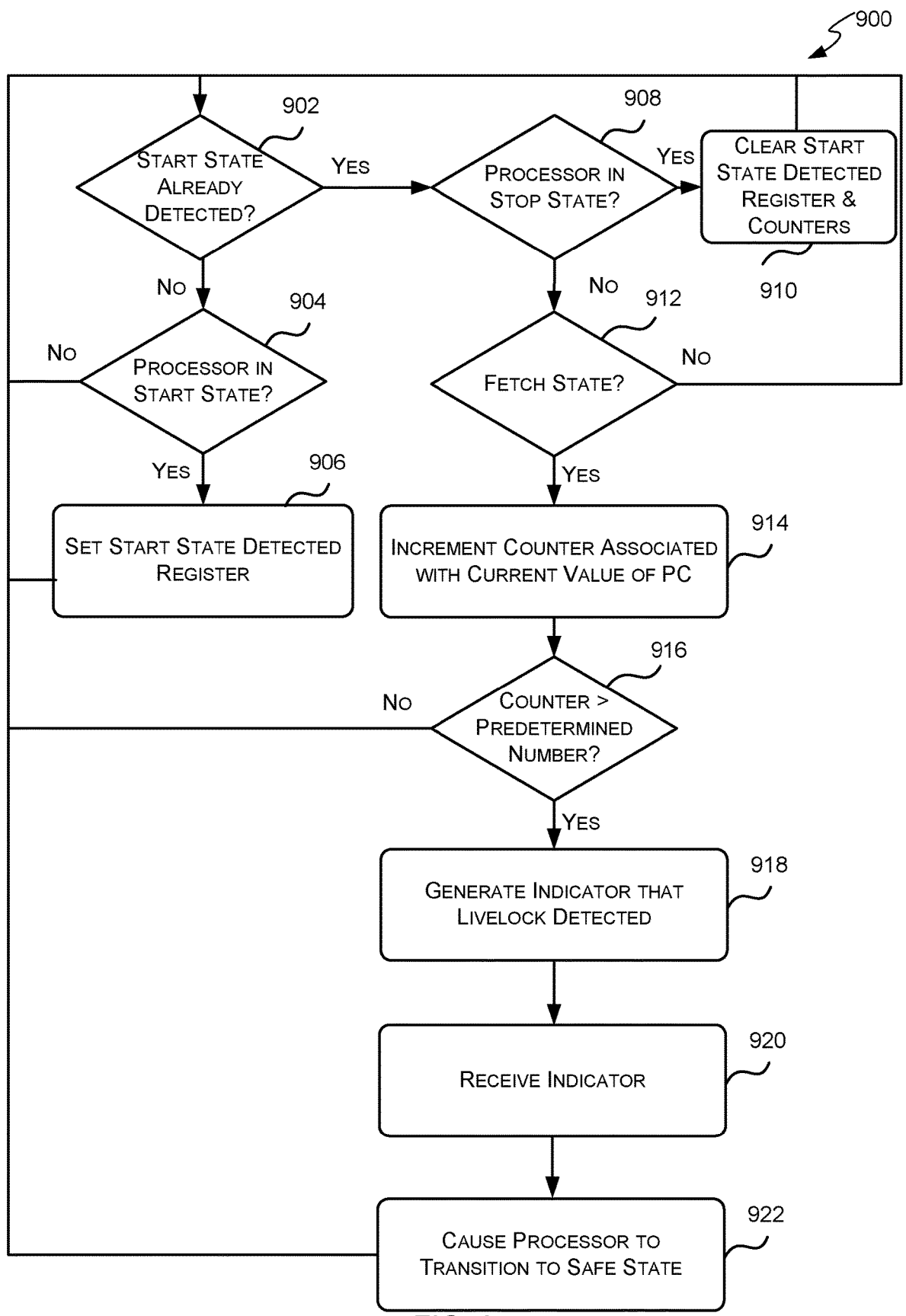
FIG. 9 is a flow diagram of an example method for detecting, and recovering from, livelock using the livelock recovery circuit of FIG. 8.

Reference is now made to FIG. 9 which illustrates an example method 900 for detecting, and recovering from, livelock in a processor which may be implemented by the livelock recovery circuit 804 of FIG. 8. The method 900 detects that a processor is in livelock if the processor has fetched an instruction from the same address more than a predetermined number of times between a start state/event and a stop state/event.

The method 900 begins at block 902 where the livelock detection logic 850 determines whether the start state has already been detected. In some cases the livelock detection logic 850 may determine whether the start state has already been detected based on the status of a start state detected register 852. If the start state has not already been detected then the method 900 proceeds to block 904. If, however, the start state has already been detected then the method 900 proceeds to block 908.

At block 904, the livelock detection logic 850 determines whether the processor is currently in the start state (e.g. idle state). In some cases, the livelock detection logic 850 may determine whether the processor is currently in the start state (e.g. idle state) based on one or more control signals of the processor. For example, the livelock detection logic 850 may be configured to sample the one or more relevant control signals. If the livelock detection logic 850 determines that the processor is currently in the start state (e.g. idle state) then the method 900 proceeds to block 906. If however, the livelock detection logic 850 determines that the processor is not currently in the start state (e.g. idle state) then the method 900 proceeds back to block 902.

At block 906, after detecting that the processor is currently in the start state the livelock detection logic 850 sets the start state detected register 852 to indicate that the start state has been detected. As described above with reference to FIG. 8, setting the start state detected register 852 to indicate that the start state has been detected may comprise setting the start state detected register 852 to a predetermined value (e.g. "1" or "0"). Once the start state detected register 852 has been set, the method 900 proceeds back to block 902.

At block 908, after detecting that the start state has already been detected, the livelock detection logic 850 determines whether the processor is currently in the stop state. In some cases, the livelock detection logic 850 may determine whether the processor is currently in the stop state (e.g. idle state) based on one or more control signals of the processor. For example, the livelock detection logic 850 may be configured to sample the one or more relevant control signals. If the livelock detection logic 850 determines that the processor is currently in the stop state (e.g. idle state) then the method 900 proceeds to block 910. If however, the livelock detection logic 850 determines that the processor is not currently in the stop state (e.g. idle state) then the method 900 proceeds back to block 912.

At block 910, after determining the processor is in the stop state, the livelock detection logic 850 clears the start state detected register 852 to indicate that the stop state has been detected, and resets the counters to zero (or another known value). Once the start state detected register 852 and the counters 854 have been cleared the method 900 proceeds back to block 902.

At block 912, after determining the processor is not in the stop state the livelock detection logic 850 determines whether the processor is currently in the fetch state. In some cases the livelock detection logic 850 may determine whether the processor is currently in the fetch state based on one or more control signals of the processor. For example, the livelock detection logic 850 may be configured to sample the one or more relevant control signals. If the livelock detection logic 850 determines that the processor is currently in the fetch state then the method 900 proceeds to block 914. If, however, the livelock detection logic 850 determines that the processor is not currently in the fetch state then the method 900 proceeds back to block 902.

At block 914, after detecting that the processor is in the fetch state, the livelock detection logic 850 increments a counter 854 associated with the current value of the program counter. In particular if the program counter indicates that an instruction was fetched from address 0x5002 then the livelock detection logic 850 increments a counter 854 associated with address 0x5002 to indicate that an instruction from address 0x5002 has been fetched one additional time since the start state has been detected and before the stop state has been detected. Once the appropriate counter 854 has been incremented the method proceeds to block 916.

At block 916, the livelock detection logic 850 determines whether any of the counters 854 is greater than the predetermined number. If any of the counters 854 is greater than the predetermined number than an instruction has been fetched too many times between the start event and the stop event (i.e. the processor has illegally repeated an instruction) indicating that the processor is likely in livelock and the method 900 proceeds to block 918. If, however, none of the counters 854 is greater than the predetermined number then the method 900 proceeds back to block 902.

At block 918, after detecting one or more of the counters 854 is greater than the predetermined number, the livelock detection logic 850 generates an indicator that livelock has been detected. In some cases, the livelock detection logic may set a register, such as the livelock detected register 856, to indicate that livelock has been detected. In other cases, the livelock detection logic 850 may output a livelock detected signal indicating that livelock has been detected. Once the livelock detection logic has generated the indicator that livelock has been detected, the method 900 proceeds to block 920.

At block 920, the transition logic 810 receives the indicator generated by the livelock detection logic 850 that livelock has been detected. For example, the transition logic 810 may read the value of the livelock detected register 856, or the transition logic 810 may receive the generated livelock detected signal. Once the transition logic 810 has received the indicator that livelock has been detected, the method 900 proceeds to block 922.

At block 922, the transition logic 810 causes the processor to transition to a known safe state. In some cases, the transition logic 810 causes the processor to transition to an idle state by setting the state of the processor to idle. However, it will be evident to a person of skill in the art that this is an example only and the transition logic 810 may cause the processor to transition to another known safe state and/or in another manner. Once the transition logic 810 causes the processor to transition to a known safe state the method 900 proceeds back to block 902.

It will be evident to a person of skill in the art that the above method is an example only and the blocks of the method may be executed in another order and some of the blocks may be omitted entirely. For example blocks 918 and 920 may be omitted entirely and the method may proceed directly from block 916 to block 922.

Blocks 902 to 914 generally correspond to block 202 of FIG. 2, blocks 916 and 918 generally correspond to block 204 of FIG. 2, and blocks 920 and 922 generally correspond to block 206 of FIG. 2.

The livelock recovery circuits of FIGS. 1, 3, 5 and 8 are shown as comprising a number of functional blocks. This is schematic only and is not intended to define a strict division between different logic elements of such entities. Each functional block may be provided in any suitable manner. It is to be understood that intermediate values described herein as being formed by a hardware monitor need not be physically generated by the hardware monitor at any point and may merely represent logical values which conveniently describe the processing performed by the hardware monitor between its input and output.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), physics processing units (PPUs), radio processing units (RPUs), digital signal processors (DSPs), general purpose processors (e.g. a general purpose GPU), microprocessors, any processing unit which is designed to accelerate tasks outside of a CPU, etc. A computer or computer system may comprise one or more processors. Those skilled in the art will realize that such processing capabilities are incorporated into many different devices and therefore the term 'computer' includes set top boxes, media players, digital radios, PCs, servers, mobile telephones, personal digital assistants and many other devices.

A hardware design, which also may be referred to herein as an integrated circuit definition data set, describes an integrated circuit. The hardware design may be implemented in software, such as HDL (hardware description language). Accordingly, there may be provided a computer readable storage medium having encoded thereon computer readable program code in the form of an integrated circuit definition dataset (e.g. hardware design) that when processed in an integrated circuit manufacturing system configures the system to manufacture a livelock recovery circuit.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS (RTM) and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a livelock recovery circuit will now be described with respect to FIG. 10.

Figure 10:
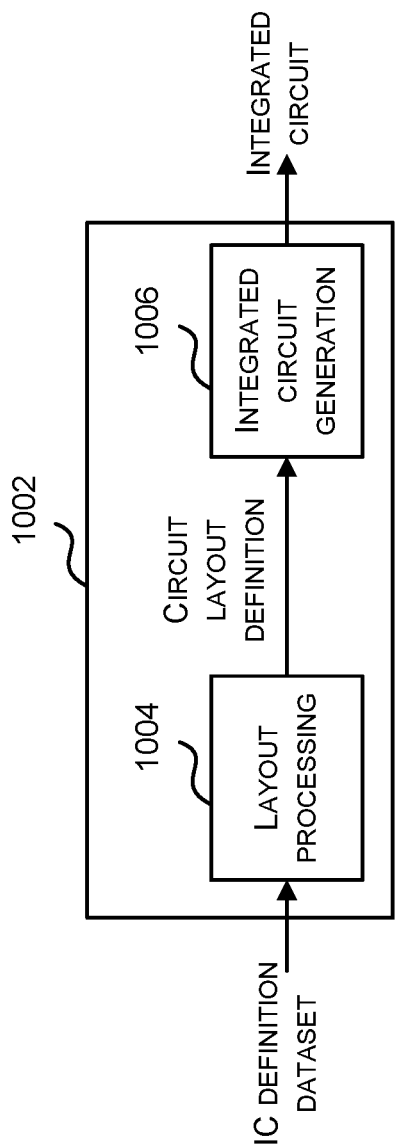
FIG. 10 is a block diagram of an example integrated circuit manufacturing system.

FIG. 10 shows an example of an integrated circuit (IC) manufacturing system 1002 which comprises a layout processing system 1004 and an integrated circuit generation system 1006. The IC manufacturing system 1002 is configured to receive an IC definition dataset (e.g. a defining a livelock recovery circuit as described in any of the examples herein), process the IC definition dataset, and generate an IC according to the IC definition dataset (which embodies a livelock recovery circuit as described in any of the examples herein). The processing of the IC definition dataset configures the IC manufacturing system 1002 to manufacture an integrated circuit embodying a livelock recovery circuit as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a livelock recovery circuit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 10 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 10, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A livelock recovery circuit for a processor comprising a program counter, the livelock recovery circuit comprising:
    detection logic configured to monitor one or more control signals of the processor to detect if the processor illegally repeats an instruction; and
    transition logic configured to, in response to the detection logic detecting that the processor has illegally repeated an instruction, cause the processor to transition to a known state;
    wherein the detection logic is configured to detect that the processor has illegally repeated an instruction by, for each of one or more previous instruction fetches, comparing a value of the program counter associated with a current instruction fetch to a value of the program counter associated with one of the one or more previous instruction fetches to determine if the values are equal to detect repeated fetch of a same instruction.

2. The livelock recovery circuit of claim 1, wherein the detection logic is configured to detect that the processor has illegally repeated an instruction when the detection logic detects from the comparing (i) that a frequency of fetching a same instruction by the processor is greater than a threshold, or, (ii) that the processor has fetched a same instruction more than a threshold number of times within a particular period.

3. The livelock recovery circuit of claim 1, wherein the detection logic is configured to detect that the processor has illegally repeated an instruction when the detection logic detects from the comparing that the processor has fetched an instruction from a same address two or more times within a predetermined number of consecutive instruction fetches.

4. The livelock recovery circuit of claim 3, wherein the predetermined number of consecutive instruction fetches is an integer X, where X is greater than one, and the one or more previous instruction fetches comprises X−1 instruction fetches preceding the current instruction fetch.

5. The livelock recovery circuit of claim 3, wherein the processor is a single cycle non-pipelined processor and the predetermined number of consecutive instruction fetches is two.

6. The livelock recovery circuit of claim 5, wherein the detection logic comprises a previous program counter vector to store a value of the program counter associated with a previous instruction fetch.

7. The livelock recovery circuit of claim 3, wherein the processor is a pipelined processor and the predetermined number of consecutive instruction fetches is greater than two.

8. The livelock recovery circuit of claim 7, wherein the predetermined number of consecutive instruction fetches is an integer X, where X is greater than two, and the detection logic comprises a program counter buffer to store the values of the program counter associated with a most recent X−1 instruction fetches.

9. The livelock recovery circuit of claim 1, wherein the detection logic is configured to detect that the processor has illegally repeated an instruction when the detection logic detects from the comparing that the processor has fetched an instruction from a same address more than a predetermined number of times between a start event and a stop event.

10. The livelock recovery circuit of claim 9, wherein the start event is the processor being in an idle state and the stop event is the processor being in an idle state.

11. The livelock recovery circuit of claim 1, wherein the detection logic comprises a livelock detected register and the detection logic is configured to set the livelock detected register upon detecting that the processor has illegally repeated an instruction.

12. The livelock recovery circuit of claim 1, wherein the detection logic is configured to, in response to detecting that the processor has illegally repeated an instruction, generate a signal indicating that the detection logic has detected the processor is in livelock.

13. The livelock recovery circuit of claim 1, wherein the transition logic is configured to cause the processor to transition to the known state by setting a state of the processor to the known state.

14. The livelock recovery circuit of claim 13, wherein the known state is an idle state.

15. The livelock recovery circuit of claim 1, wherein the transition logic is configured to cause the processor to transition to the known state by invoking an interrupt.

16. The livelock recovery circuit of claim 1, wherein the livelock recovery circuit is embodied in hardware on an integrated circuit.

17. A method of recovering a processor comprising a program counter from livelock, the method comprising:
monitoring, by a livelock recovery circuit, one or more control signals of the processor to detect when the processor has illegally repeated an instruction; and
in response to detecting that the processor has illegally repeated an instruction, causing, by the livelock recovery circuit, the processor to transition to a known state;
wherein detecting that the processor has illegally repeated an instruction comprises, for each of one or more previous instruction fetches, comparing a value of the program counter associated with a current instruction fetch to a value of the program counter associated with one of the one or more previous instruction fetches to determine if the values are equal to detect repeated fetch of a same instruction.

18. A computer system comprising the processor and the livelock recovery circuit as set forth in claim 1.

19. A non-transitory computer readable storage medium having stored thereon a computer readable description of an integrated circuit that, when processed in an integrated circuit manufacturing system, causes the integrated circuit manufacturing system to manufacture a livelock recovery circuit comprising:
detection logic configured to monitor one or more control signals of a processor comprising a program counter to detect if the processor illegally repeats an instruction; and
transition logic configured to, in response to the detection logic detecting that the processor has illegally repeated an instruction, cause the processor to transition to a known state;
wherein the detection logic is configured to detect that the processor has illegally repeated an instruction by, for each of one or more previous instruction fetches, comparing a value of the program counter associated with a current instruction fetch to a value of the program counter associated with one of the one or more previous instruction fetches to determine if the values are equal to detect repeated fetch of a same instruction.

* * * * *

UNITED STATES PATENT AND TRADEMARK OFFICE
CERTIFICATE OF CORRECTION

| | |
|---|---|
| PATENT NO. | : 11,467,840 B2 |
| APPLICATION NO. | : 16/743586 |
| DATED | : October 11, 2022 |
| INVENTOR(S) | : Darbari et al. |

It is certified that error appears in the above-identified patent and that said Letters Patent is hereby corrected as shown below:

In the Specification

Column 17 Line 30 - livelock detection logic 850
Should be livelock detection logic 950

Signed and Sealed this
Seventeenth Day of January, 2023

Katherine Kelly Vidal
*Director of the United States Patent and Trademark Office*